June 4, 1940.  J. L. KOUBEK ET AL  2,203,499
GRILLE GUARD
Filed Jan. 21, 1938    2 Sheets-Sheet 1
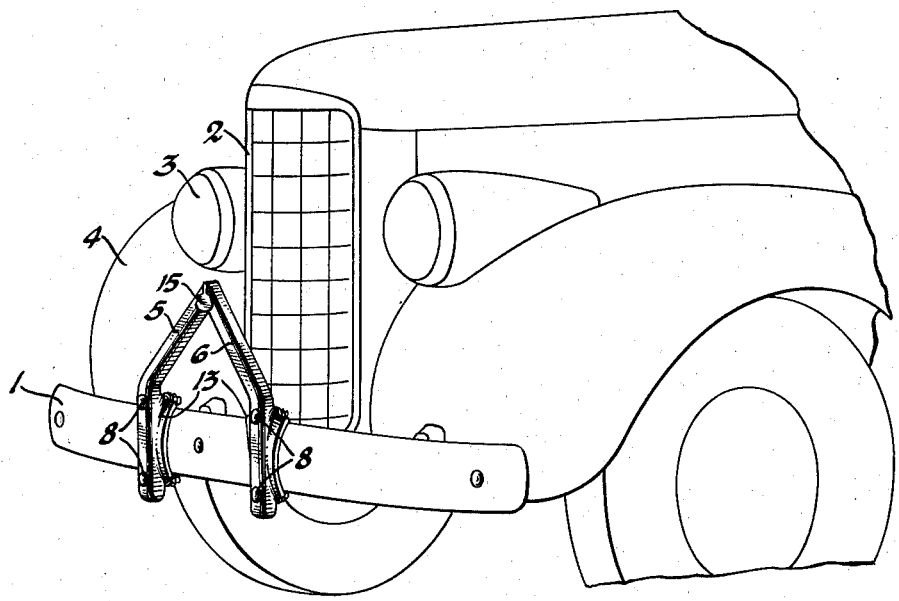
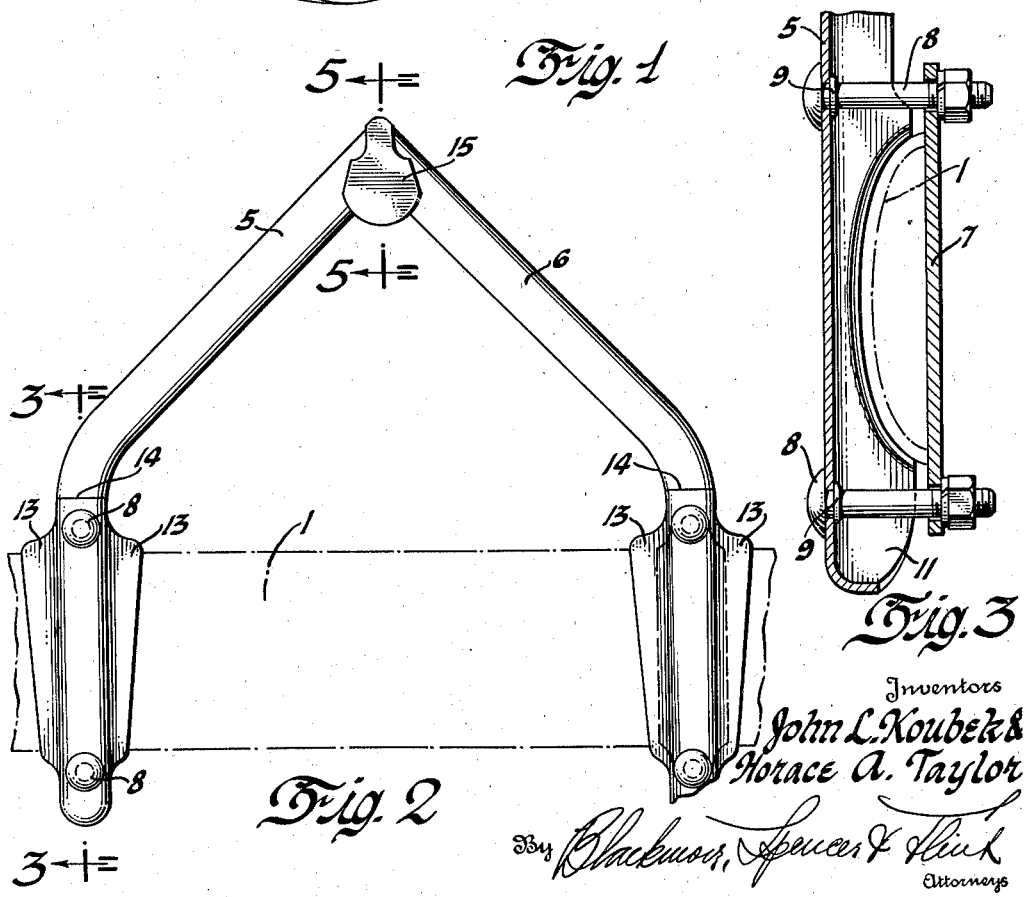
Inventors
John L. Koubek &
Horace A. Taylor
By Blackmore, Spencer & Hink
Attorneys June 4, 1940. J. L. KOUBEK ET AL 2,203,499
GRILLE GUARD
Filed Jan. 21, 1938  2 Sheets-Sheet 2

Inventors
John L. Koubek &
Horace A. Taylor
By Blackmore, Spencer & Flint
Attorneys Patented June 4, 1940

2,203,499

UNITED STATES PATENT OFFICE 2,203,499

GRILLE GUARD

John L. Koubek and Horace A. Taylor, Anderson, Ind., assignors to General Motors Corporation, Detroit, Mich., a corporation of Delaware Application January 21, 1938, Serial No. 186,018

5 Claims. (Cl. 293—55)

This invention relates to impact receiving devices and is intended to afford protection against injury as a result of vehicle collision. The device has been designed as accessory equipment for motor vehicles and as such will be mounted on the usual bumper bar to increase the shielding range and to reduce the likelihood of entanglement with obstacles.

One of the primary objects of the present invention is to provide a rugged but neat appearing structure which can be made available to the public at small cost. With this in mind the invention includes a triangular guard made up essentially of two structural section bars arranged to be mounted at their lower ends in spaced apart relation and to converge upwardly with their ends in interconnected seating abutment at the point of convergence. The result is a comparatively light weight but inherently strong and rigid structure which will fit into and improve the general appearance of the automobile.

Figure 4:
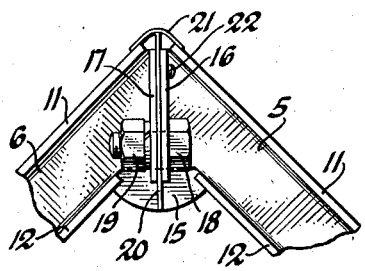
Figure 5:
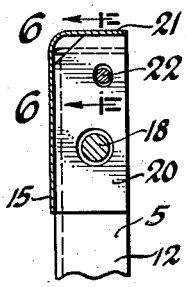
Figure 6:
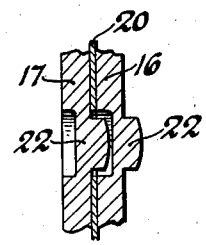
Figure 7:
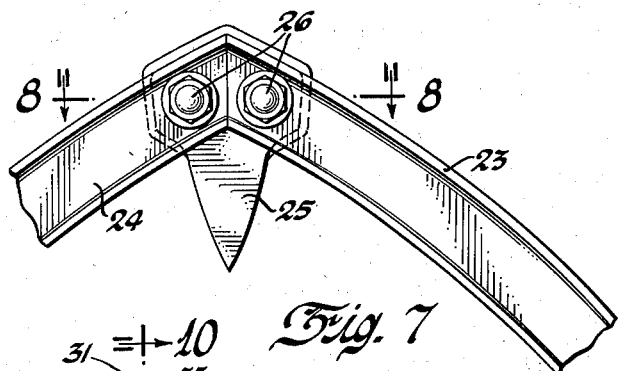
Figure 8:
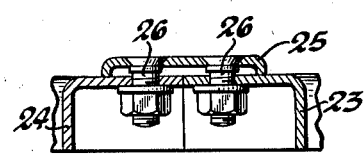
Figure 9:
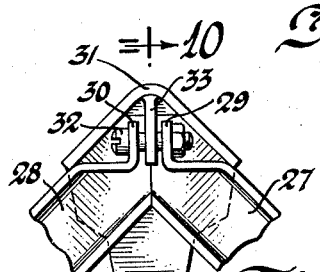
Figure 11:
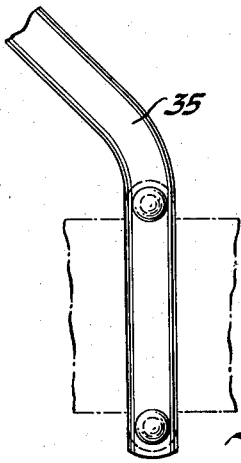
Figure 10:
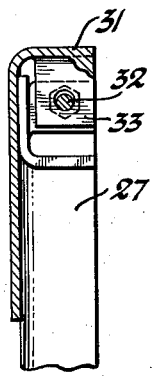
Figure 12:

For a better understanding of the invention reference may be made to the accompanying drawings wherein Figure 1 is a perspective view of a front portion of a motor vehicle showing the application of the guard thereto; Figure 2 is a front view of the guard; Figure 3 is a detail sectional view taken on line 3—3 of Figure 2; Figure 4 is a rear view of a fragment of the guard showing the connection at the apex of the bars; Figure 5 is a detail section taken on line 5—5 of Figure 2; Figure 6 is a view on line 6—6 of Figure 5; Figure 7 shows a fragment of the guard with a modified type of interconnection between the ends of the bars; Figure 8 is a section on line 8—8 of Figure 7; Figure 9 illustrates an optional form of interconnection; Figure 10 is a section on line 10—10 of Figure 9, and Figures 11 and 12 show a simplified mounting foot.

In the drawings the reference numeral 1 indicates the usual impact bar at the front of the vehicle forward of the radiator grille 2, headlamps 3 and fenders 4. These are the parts which are most often damaged in the event of collision and their repair or replacement is costly. An increased measure of protection will be afforded by combining with the usual bumper 1 the triangular guard which forms the subject matter hereof.

For economy and convenience in manufacture it is proposed that the guard comprise a pair of complementary members formed by stamping operations to cross sectional shapes which impart strength thereto and to interconnect such parts in definite fixed relation to afford a rigid assembly. When the assembly is rigidly mounted on the bumper bar through the spaced apart feet of the guard the parts are tied together affording a triangular buffer capable of withstanding severe impact.

In the drawings the apex of the guard is located on the center line of the vehicle and the right-hand and left-hand bars 5 and 6, respectively, extend downwardly and outwardly and at their lower end each bar terminates in a vertically disposed mounting foot adapted to be clamped to the bumper bar by means of a plate 7 extending in back of the bumper 1 and secured by upper and lower nut and bolt assemblies 8 carried by the guard bars. As shown in Figure 3 the bolts extend through the bars with the bolt heads bearing against the front face and with upset collars 9 bearing against the rear face to maintain the bolts in fixed relation to the bar. Optionally the head of the bolt may be welded to the inner face of the bar or otherwise attached thereto.

In the interests of a secure fastening the side flanges 11 and 12 of the bars may be shaped to conform to and provide recesses which receive the front face of the bumper bar 1 and to increase the seating surface and enhance general appearance the side flanges of the channel may additionally be turned outwardly as at 13. As a manufacturing detail, the feet portions may be formed separately from the upwardly extending bars and welded to the lower ends of the bars as indicated along the line 14 in Figure 2 in which event both feet portions can be formed in the same die with a resulting saving in die cost.

The upwardly convergent bars 5 and 6 are joined together at their apex behind a shield or medallion plate 15 which covers the line of jointure and provides some ornamentation. If desired this cover plate 15 may carry the trademark or be shaped to the form of the shield of either the guard manufacturer or the manufacturer of the automobile with which the guard is used. Alternately a separate shield may be bolted to the cover plate 15. At any rate it is proposed that the shield 15 be secured by the same means which fastens the bars together.

In one form of interconnection the web portions extend beyond the inner and outer flanges 11 and 12 of the channel section bars 5 and 6 and are turned inwardly as at 16 and 17 to lie in vertical planes at the longitudinal center line of the vehicle and to constitute attachment ears which, by reason of their abutment, determine the angle of convergence of the bars 5 and 6 thereby insuring proper assembly. A fastening bolt 18 having a nut 19, extends through the ears 16 and 17 to clamp the parts securely and the insertion of a wrench or other tool for engagement with the nut 19 and the head of the bolt 18 is facilitated by the fact that the flanges 12—12 end short of the attachment ears 16 and 17. The bolt also extends through an opening in an attachment plate 20 which is interposed between the ears 16 and 17 and extends rearwardly from and is welded or otherwise secured to the cover plate 15. A rearward extension 21 at the upper end of the cover plate conceals the top of the joint between the bars. To assist in locating the parts and relieve the fastening bolt from some twisting strain the flanges 16 and 17 are provided with alined deformations as at 22 which provide a projecting lug on the abutment face of the ear 17 and a lug receiving recess in the abutment face of the lug 16, the mounting plate 20 being provided with an opening to permit the passage therethrough of the projecting interlocking lug.

In the form shown in Figure 7 the web and both flanges of the bars 23 and 24 are continuous to the upper ends and are in end to end abutment with one another on a line which determines the convergence of the bars. In this instance the interconnection is through the cover plate 25 which has a pair of studs 26 riveted thereto for passage through openings in the adjoining ends of the bars 23 and 24 and which receive fastening nuts for holding the parts together. As will be noted in Figure 8 the attachment studs in this instance are flush with the front face of the cover plate 25.

In Figure 9 the bars 27 and 28 abut through the inner flange and webs while their outer flanges extend inwardly and then terminate in upwardly extending abutment ears 29 and 30 located under the shield 31 and are secured together by a nut and bolt assembly 32 which also locates the attachment ear 33 of the cover plate 31.

Figures 11 and 12 illustrate the omission of the outturned flange 13 shown in Figure 2 in which case the side flanges of the bars 35 are simply cut out to conform to the shape of the bumper bar and the cut-out portions seat on the front face of the bar and are retained in position by the clamping plate 36 as before described.

We claim:
1. A guard of the character described, including a pair of channel section members, having at adjacent ends web extensions turned laterally for seating relation to each other, with the side flanges ending short of the ends to provide clearance for access to the fastening connection between said lateral extensions.

2. A supplemental bumper guard comprising a pair of vertically disposed and convergently related bars of channel section adapted to be mounted at their lower ends on a bumper assembly, abutment seats at the apex of said bars comprising laterally turned extensions, a joint cover plate having a mounting ear interposed between said extensions and a fastening bolt projecting through said extensions and said ear to secure the parts in assembled relation.

3. A bumper guard including convergently related channels having inturned extensions at adjacent ends to provide locating seats, a projecting lug on the abutment face of one of said extensions, a lug receiving recess on the abutment face of the other extension and fastening means holding said extensions together.

4. A supplemental bumper guard comprising upwardly convergent bars, each having a vertical web and a rearwardly extending flange, said webs at the apex of said bars being in end to end abutment on a line which determines the convergence of the bars, an appearance plate covering the line of abutment and having a rearward attachment lug, said flanges terminating in attachment ears cooperating with said lug and a fastening element connecting said ears and lug to hold the parts in assembly.

5. A bumper guard comprising convergent bars, each having a vertical web and a rearwardly extending flange, said webs at the apex of said bars being in end to end abutment on a line which determines the convergence of the bars, an appearance plate covering the line of abutment in the front face of the webs and overlying said flanges, said flanges extending inwardly under said plate and then upwardly to provide cooperating attachment ears, a fastening element joining said ears and a mounting lug carried by said plate and held in place by said element.

JOHN L. KOUBEK.
HORACE A. TAYLOR.